United States Patent [19]

Melman et al.

[11] Patent Number: 5,359,458
[45] Date of Patent: Oct. 25, 1994

[54] SCANNER

[75] Inventors: Haim Z. Melman, Kfar Sava; Eran Elizur, Tel Aviv, both of Israel

[73] Assignee: Scitex Corporation Ltd., Herzliya, Israel

[21] Appl. No.: 920,031

[22] Filed: Jul. 27, 1992

[30] Foreign Application Priority Data

Aug. 1, 1991 [IL] Israel ............................ 99039
Jul. 21, 1992 [IL] Israel ............................ 102594

[51] Int. Cl.⁵ .......................................... G02B 27/02
[52] U.S. Cl. .................................. 359/799; 359/599; 362/259; 362/277
[58] Field of Search .......... 359/196, 558, 554, 599, 359/798, 799, 800; 362/135, 138, 139, 142, 187, 220, 259, 277, 285, 296, 311, 319, 326, 327, 328; 250/204, 201.5, 201.8, 216, 227.14, 227.26

[56] References Cited

U.S. PATENT DOCUMENTS

| | | | |
|---|---|---|---|
| 3,754,814 | 8/1973 | Leith | 359/599 |
| 4,834,520 | 5/1989 | Klainman | 359/509 |
| 4,851,978 | 7/1989 | Ichihara | 362/259 |
| 4,904,034 | 2/1990 | Narayam et al. | 359/17 |
| 5,016,149 | 5/1991 | Tanaka et al. | 362/259 |
| 5,046,838 | 9/1991 | Iwasaki | 362/277 |

*Primary Examiner*—Loha Ben
*Assistant Examiner*—Thomas Robbins
*Attorney, Agent, or Firm*—Ladas & Parry

[57] ABSTRACT

A scanner comprising a light source, having non-uniformities, for transmitting light through an input sample, and a cassette for holding the input sample, wherein a distance from the light source to the cassette is long enough to cause the effects of the non-uniformities to be substantially reduced.

24 Claims, 14 Drawing Sheets

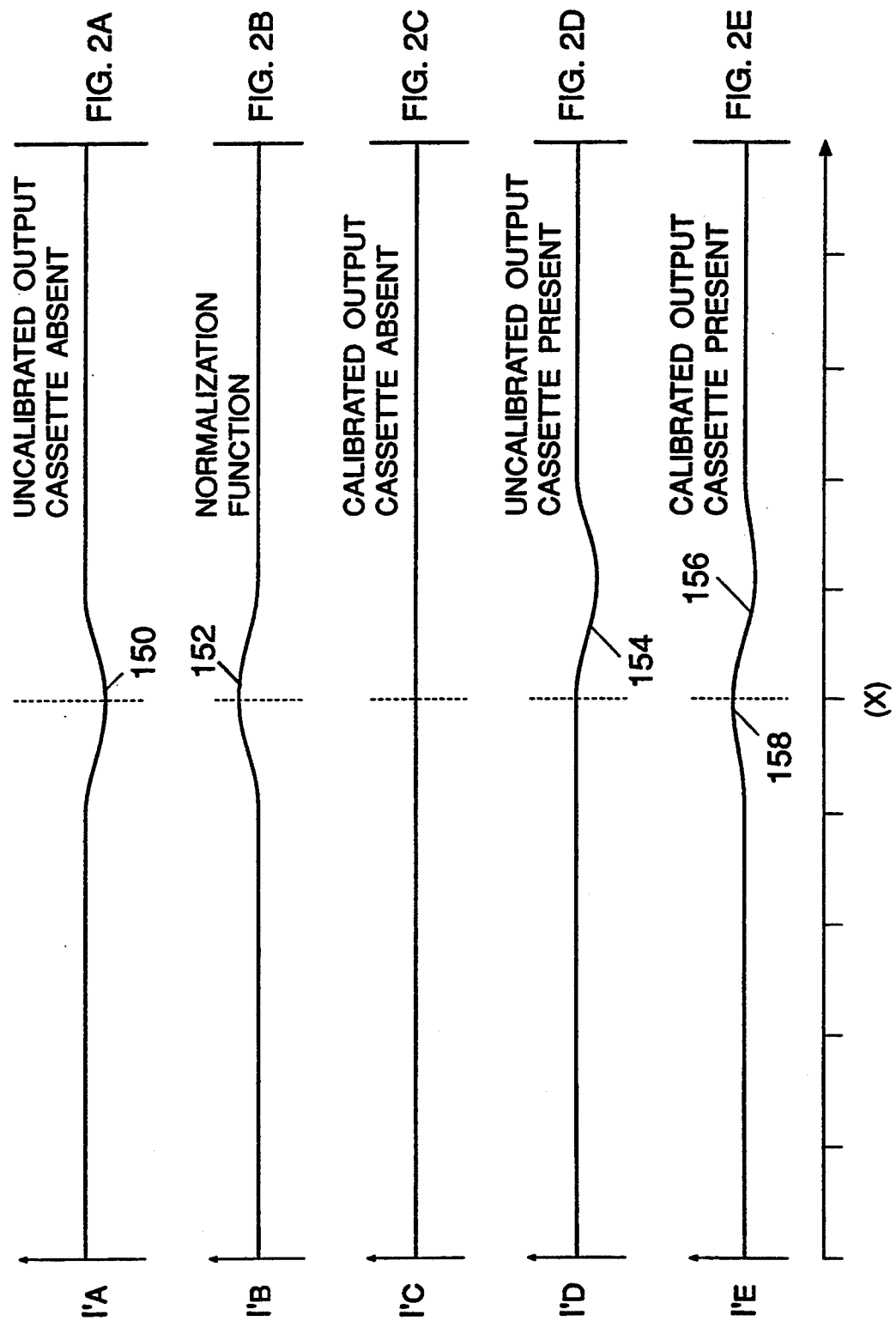

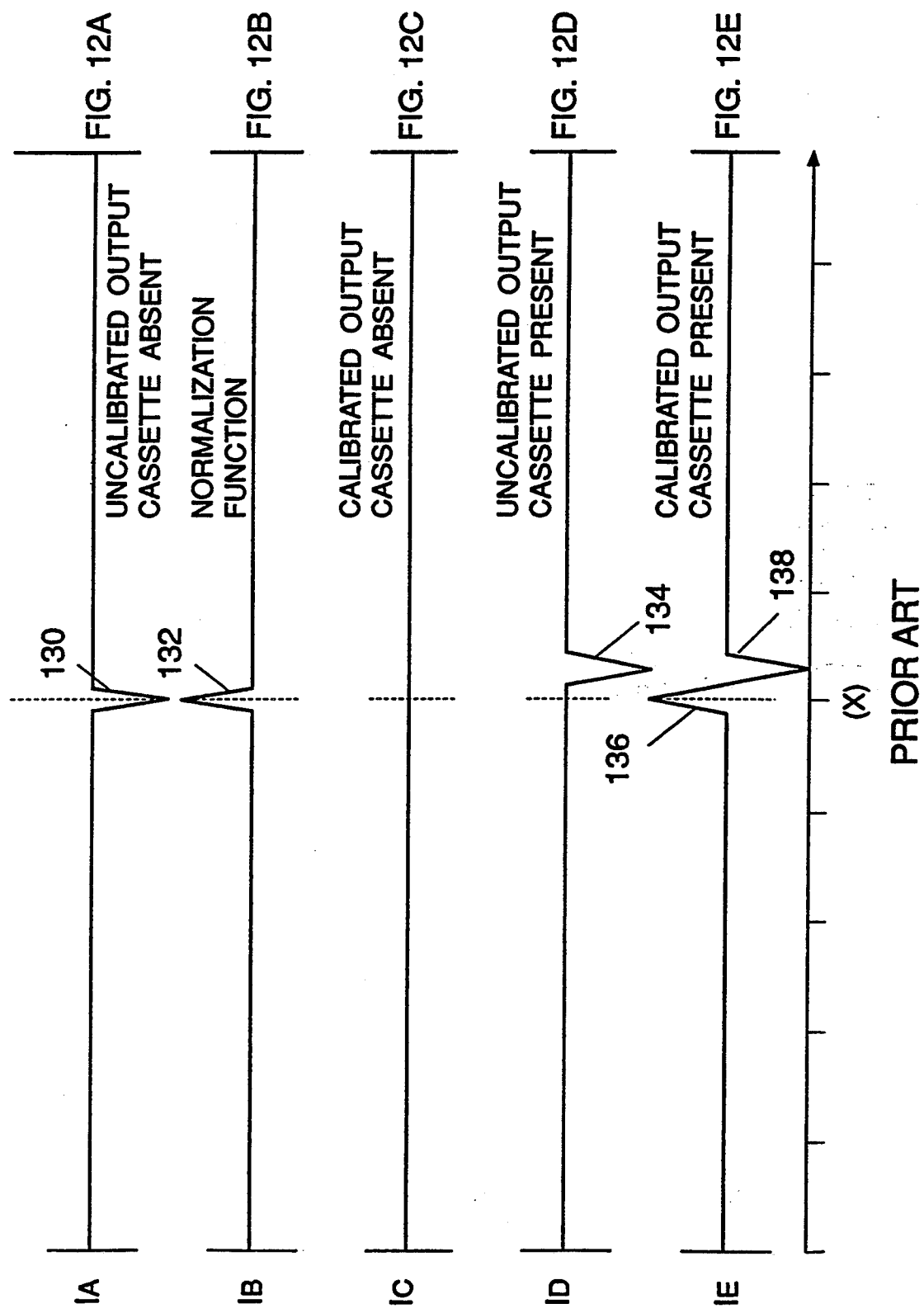

SCANNER

FIELD OF THE INVENTION

The present invention relates to optical input scanners generally and to scanners incorporating correction apparatus for light source non-uniformities, in particular.

BACKGROUND OF THE INVENTION

It is well known in the art that an image located on an input sample, such as a transparency, may be read by a specific family of optical scanners. A scanner of this family generally comprises a light source, a lens, an apparatus for holding the input sample, and a detector array. The input sample is often held in a cassette comprised of two glass plates.

It is important that the output of the scanner be uniform in the presence of a uniform input. Non-uniform scanner output often occurs because individual detectors in the detector array have different sensitivities to light and, therefore, do not output identically even while receiving identical inputs. This problem is corrected by normalization, i.e., by multiplying each detector's output by a suitable factor to produce a normalized output, such that each of the normalized outputs is identical.

Non-uniform scanner output may also result from a variety of non-uniformities of the light source. For example, a fluorescent lamp light source might have a scratch or a non-uniform phosphor coating on its glass tube, or a light source employing fiber optic bundles might have non-uniform bundle packaging or a break in one or more fibers.

Non-uniform scanner output results in non-uniform images of the input sample. For example, scratches on the glass of the light source cause abrupt changes in light intensity which, in turn, causes thin or sharp stripes in the output image. "Slow" changes in light intensity (changes which vary slowly as a function of the spatial position on the lamp) cause wide or smooth stripes in the output image.

Thin or sharp stripes in the image are the most undesirable whereas wide or smooth stripes are often difficult or impossible for an observer to notice.

As the sharp non-uniformity is undesirable, the light source non-uniformity is compensated in a number of ways. The cassette can be moved until a portion of the cassette in which there is no transparency is in the optical axis. The light distribution on the detector is then measured to establish correction factors.

However, the optical quality of the cassette is rarely consistent throughout the cassette. Thus, the light distribution during scanning can be different than that during calibration which occurrence will produce non-uniform output images.

Another way to solve the light non-uniformity problem is to remove the cassette during calibration and thus, to ensure that the inconsistencies of the cassette do not compound the light uniformity error. However, in this solution, the optical system for calibration is significantly different than that for scanning. The image of the light source on the detector with the cassette on an optical axis of the scanner is larger than it is without the cassette and therefore, the light non-uniformity sensed by the detector is different during scanning than during calibration.

SUMMARY OF THE INVENTION

It is therefore an object of the present invention to correct errors in optical scanner output due to scanner light source non-uniformities such that the output is generally the same during scanning and calibration.

In accordance with the present invention, the object is achieved through placing the light source at a distance from the focal plane far enough to cause the effects of the non-uniformities to be reduced. The calibration of the detector is then performed.

Alternatively, the large distance is provided by folding the optical axis via a mirror or light guide.

In a further embodiment, the light source is placed close to the focal plane and a "low quality" calibration glass is used during calibration. A number of measurements are typically taken and averaged together to provide calibration of the detector.

In a still further embodiment, the cassette is placed on the scanner, with the light source close to the focal plane. Calibration is performed without the cassette and the affect of the different optical properties is compensated computationally.

In a final embodiment, a diffuser is placed between the light source and the cassette to blur the non-uniformities of the lamp.

In accordance with the present invention there is provided a scanner including a light source, having non-uniformities, for transmitting light through an input sample and a cassette for holding the input sample wherein a distance from the light source to the cassette is long enough to cause the effects of the non-uniformities to be substantially reduced.

The scanner hereby provided has an optical axis and also includes a mirror or a light guide located between the light source and the cassette, for folding the optical axis.

A 15 mm diameter lens is located 200 mm from the cassette and the distance from the light source to the cassette is 100 mm.

In accordance with an additional embodiment of the present invention there is provided a scanner including a light source, having non-uniformities, for transmitting light through an input sample, a light detector apparatus for detecting light originating from the light source and a calibration glass for calibrating the light detector apparatus so as to cause the effects of the non-uniformities to be reduced. The scanner thus provided also has a focal plane and a cassette for locating the input sample in the focal plane and a lens. The calibration glass therein is of good quality and is located between the light source and the lens and may be located near or away from the focal plane.

The scanner thus provided additionally includes apparatus for averaging multiple readings from the detector apparatus corresponding to a multiplicity of regions of the calibration glass, thereby to average effects of bubbles in the calibration glass and dust on the calibration glass. The calibration glass has a good flatness and parallelism value and a low surface scratches and digs quality.

The scanner may be calibrated without the cassette and without the calibration glass and also includes compensation apparatus for compensating for the presence of the cassette during operation wherein the compensation apparatus perform geometrical correction calculations based on the optical qualities of the cassette and the lens.

In accordance with a further embodiment of the present invention there is provided a scanner including a light source, having non-uniformities, for transmitting light through an input sample, a cassette for holding the input sample and a diffuser located between the light source and the cassette for diffusing the light, thereby to cause the effects of the non-uniformities to be reduced.

Additionally, in accordance with a still further embodiment of the present invention, the light detector apparatus includes a plurality of detectors and the compensation apparatus includes apparatus for determining on which detector light from a section of the light source will fall, in the presence and absence of the cassette glass.

Furthermore, in accordance with an embodiment of the present invention, the scanner also includes apparatus for determining an expected output signal of each of the plurality of detectors as a result of the intensity of light received from a corresponding section of the light source. The apparatus preferably comprises a) apparatus for measuring the output of the detector as a response to a first and second light distributions over the light detector apparatus, wherein the first and second light distributions are different and b) apparatus for determining, from the responses to the first and second light distributions, the output of the light detector apparatus in response to a third light distribution over the light detector apparatus.

Still further, in accordance with an embodiment of the present invention, the scanner includes apparatus for providing a displacement of at least one of the light source, the light detector apparatus and a lens, located between the light source and the light detector apparatus, thereby to provide the first and second light distributions.

There is also provided, in accordance with an embodiment of the present invention, a method of calibrating a scanner comprising the steps of a) measuring an output signal of at least two detectors of a light detector array in response to a first light distribution over the light detector array, b) displacing a portion of the scanner, in a direction generally parallel to a longitudinal axis of the light detector, thereby to provide a second light distribution over the light detector, c) measuring an output signal from the at least two detectors in response to the second light distribution and d) determining, from the responses to the first and second light distributions, the output of the detector array in response to a third light distribution over the detector array. The step of displacing preferably includes the step of non-uniform displacement.

There is further provided, in accordance with an embodiment of the present invention, A scanner including a light source, a lens, a light detector which receives light from the light source through the input sample and lens, wherein the light source, lens and light detector have non-uniformities therein, apparatus for creating an average calibration signal to correct for fixed ones of the non-uniformities and apparatus for modifying low frequency components of the average calibration signal with low frequency components of a pre-scan calibration signal.

Additionally, in accordance with an embodiment of the present invention, the apparatus for creating includes apparatus for dividing the average calibration signal into low and high frequency components.

Moreover, in accordance with an embodiment of the present invention, the apparatus for creating includes apparatus for receiving output from the light detector corresponding to a first plurality of scans and wherein the apparatus for modifying includes apparatus for receiving output from the light detector corresponding to a second plurality of scans, wherein the second plurality is much smaller than the first plurality.

There is finally provided, in accordance with an embodiment of the present invention, a scanner including a cassette upon which dust falls, a lens, a light detector, a light source for transmitting light through the cassette and lens to the light source and a diffuser located between the cassette and the lens during a calibration pre-scan, thereby to reduce effects of the dust on the light detector.

BRIEF DESCRIPTION OF THE DRAWINGS

The present invention will be understood and appreciated more fully from the following detailed description taken in conjunction with the drawings in which:

FIGS. 2A–2E illustrate the signal output of the scanner of FIG. 1 in the presence and absence of a cassette;

FIGS. 12A–12E graphically illustrate the signal output of the scanner of FIG. 11 in the presence and absence of a cassette.

DETAILED DESCRIPTION OF THE PRESENT INVENTION

Figure 11:
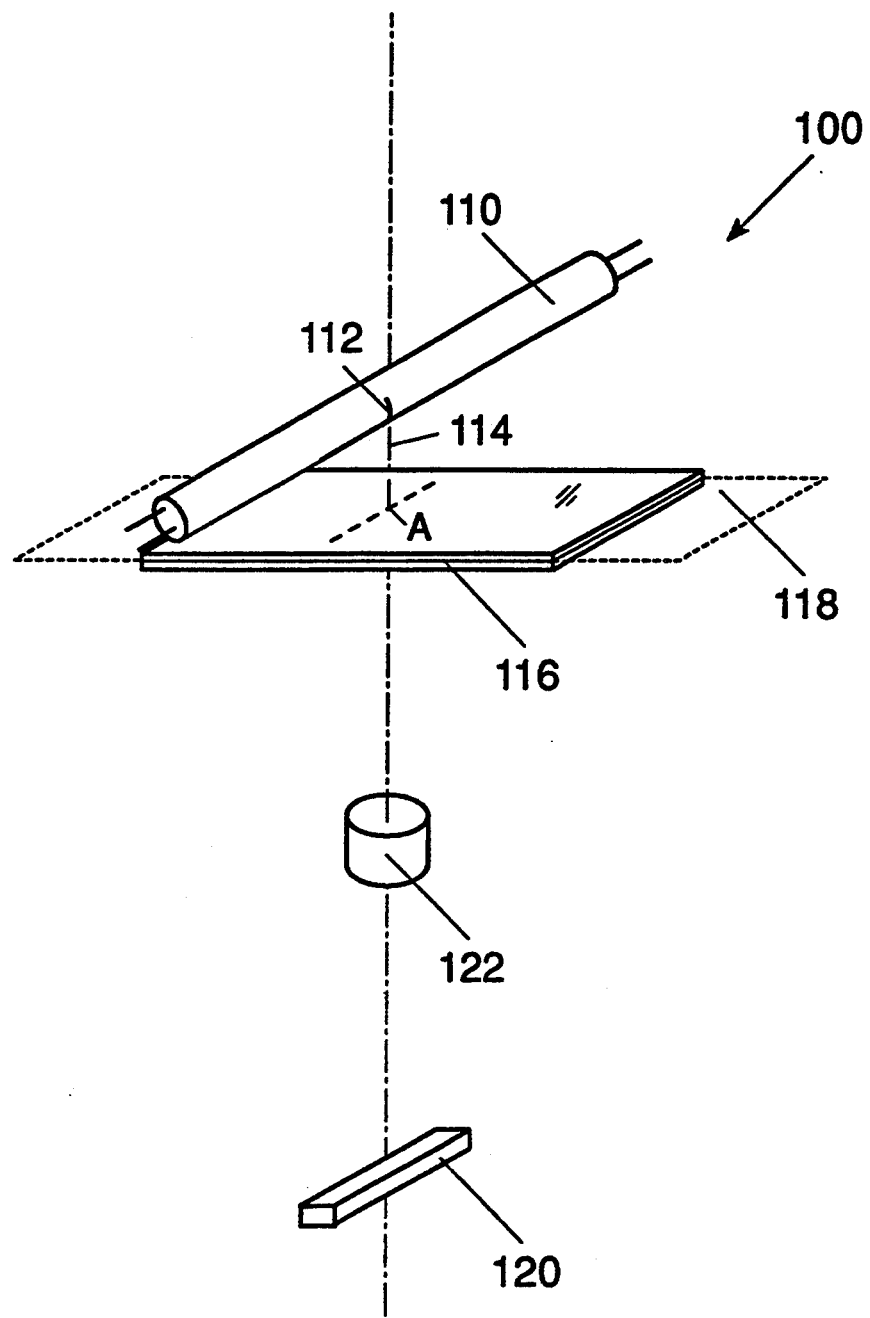
FIG. 11 is a schematic illustration of a prior art optical scanner.

Reference is now made to FIG. 11 which illustrates features of a prior art optical scanner 100. The scanner comprises a long and relatively narrow light source 110, such as a fluorescent lamp, typically containing a defect 112, for transmitting light in the direction of a lens 122 and an input sample (not shown), such as a transparency. Lens 122 is operative to focus an image of the input sample onto a detector array 120, such as a Charge Coupled Device (CCD) detector array. As known in the art, the numerical aperture of the lens 122 establishes the depth of field of the scanner 100.

The scanner further comprises a cassette 116 for holding the input sample, located in a focal plane 118, and detector array 120 for electronically detecting light transmitted from the light source through the input sample. For each point on a scanned line, the scanner 100 has a light path from light source 110 to focal plane 118. An example light path, labeled 114, is shown for a point A.

Reference is now made to FIGS. 12A–12E which graphically illustrate the performance characteristics of prior art scanner 100 (FIG. 11), including characteristics of a calibration procedure in which normalization is performed in order to correct for the presence of defect 112 (FIG. 11). FIGS. 12A–12E plot array detector signal output $I_N(x)$ versus detector array position x, where N is a reference index.

During the calibration procedure, cassette 116 is removed in order to avoid artifacts arising from cassette defects or irregularities. Light source 110 is turned on and the output of detector 120 is observed. This demonstrates the signal non-uniformity during calibration when the cassette is absent.

FIG. 12A illustrates a signal output $I_A(x)$ before calibration when the cassette 116 is absent. An abrupt signal output deficiency 130 is apparent at the region of detector array 120 corresponding to an image resulting from defect 112.

FIG. 12B shows a normalization function $I_B(x)$ containing a compensating region 132 typically used to correct for the signal deficiency 130. The normalization function is generally calculated according to the following equation:

$$I_B(x) = \frac{I_{Amax}}{I_A(x)} \quad (1)$$

where $I_B(x)$ is the normalization function and $I_{Amax}$ is the maximum signal intensity over the entire signal.

FIG. 12C illustrates a uniform output $I_C(x)$ resulting from multiplying function $I_A(x)$ by normalization function $I_B(x)$ as follows:

$$I_C(x) = I_A(x) * I_B(x) \quad (2)$$

In practice, however, prior art calibration does not typically lead to the uniform output $I_C(x)$ during scanner operation, which operation includes placing the cassette 116 in the optical path. No uniform output is produced because cassette 116, typically made of glass with an optical index of refraction greater than 1.0, refracts light that passes through it.

FIG. 12D illustrates a signal output $I_D(x)$ containing a signal deficiency 134 resulting from defect 112. The array position of signal deficiency 134 is shifted with respect to the array position of signal deficiency 130 due to refractive properties of cassette 116.

FIG. 12E illustrates a signal output $I_E(x)$ with cassette 116 in place during scanner operation. When the normalizing function $I_B(x)$ is multiplied by the output function $I_D(x)$, the output function $I_E(x)$ is obtained which contains two sharp and adjacent peaks 136 and 138. The output intensity is obtained by the following equation:

$$I_E(x) = I_D(x) * I_B(x) \quad (3)$$

Peak 136 arises because compensating region 132 is multiplied by a flat portion of output signal $I_D(x)$. Peak 138 arises because signal deficiency 134 is multiplied by a flat portion of normalization function $I_B(x)$ and remains uncompensated. These peaks manifest themselves in an output image as visible artifacts in the form of two thin, sharp stripes wherein one stripe, associated with peak 138, is dark and the other stripe, associated with peak 136, is bright.

The present invention provides a multiplicity of solutions, described in detail hereinbelow, to the above-identified problems of prior art scanners. The solutions of the present invention can be utilized singly or in any desired combination. Typically, calibration is performed before each scan.

Figure 1:
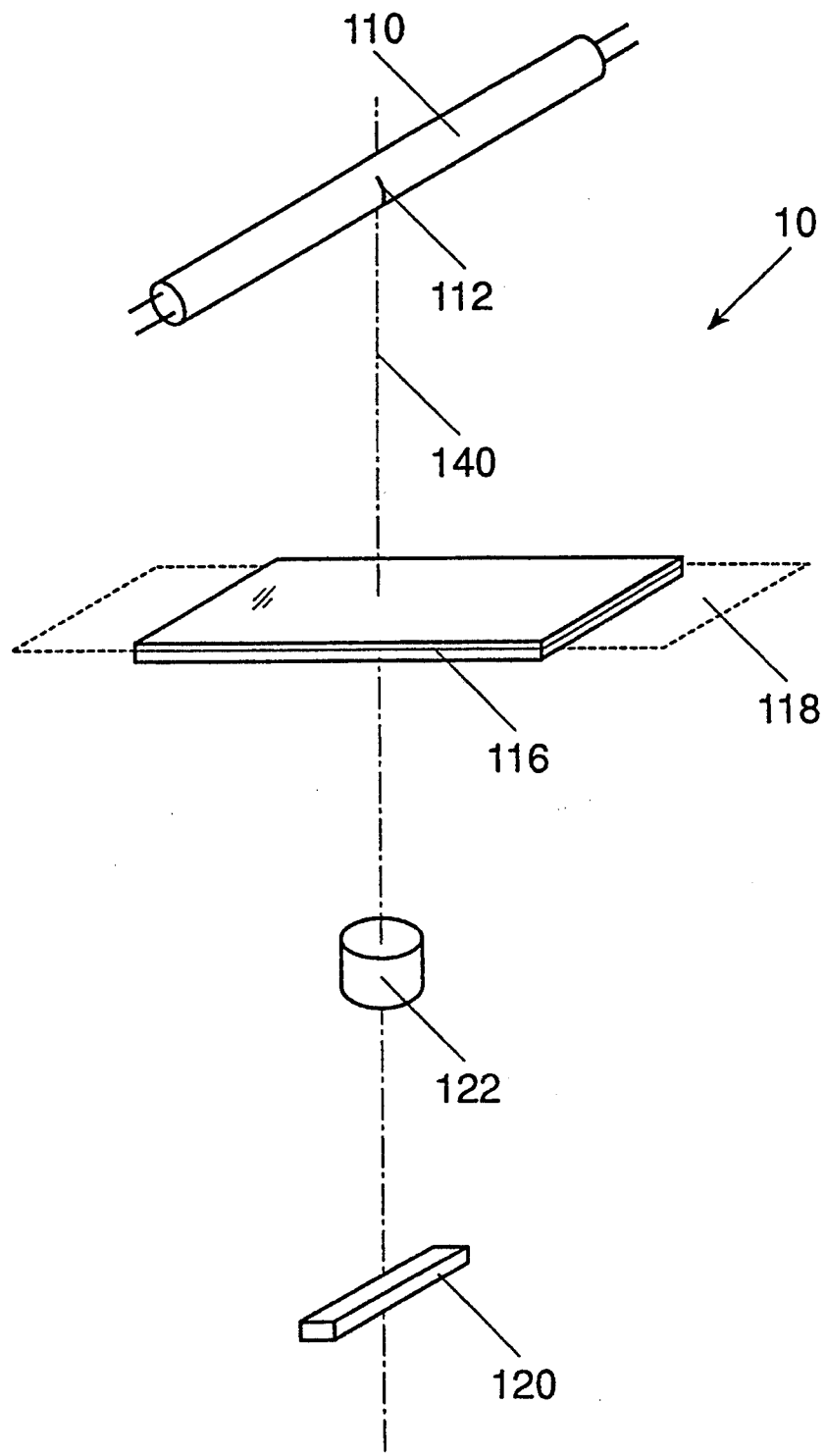
FIG. 1 is a schematic illustration of an optical scanner constructed and operative in accordance with the present invention.

Providing a light source far from the focal plane:

Reference is now made to FIG. 1 which illustrates features of an optical scanner 10 constructed and operative in accordance with the present invention. Similar elements in scanner 10 and scanner 100 (FIG. 11) serve similar functions and are referenced by similar reference numerals.

In accordance with the present invention, scanner 10 further comprises a light path 140 which is long relative to light paths in prior art scanner 100, for modifying transmitted light in order to compensate for effects of defect 112. Light path 140 is large, relative to light path 114 in prior art scanner 100 (FIG. 11), such that the non-uniformities in the light output become out of focus. Therefore, signal intensity peaks associated with the non-uniformities are wide and have small gradients and amplitudes. Thus, the non-uniformities are rendered negligible in an output image.

The length of light path 140 allows light coming from defect 112 to be distributed over a larger number of CCD detectors than in prior art scanner 100 and, in this way, reduces the irregularity of the output signal.

For example, for a lens with a diameter of 15 mm which is located 200 mm from the focal plane 118, the light source 110 should be located 100 mm from the focal plane 118. It will be appreciated that 100 mm is approximately twice the prior art distance.

Reference is now made to FIGS. 2A–2E which graphically illustrate the reduced irregularity effected by scanner 10. As in FIGS. 12A–12E, $I'_N(x)$ is plotted versus x and is calculated in the same fashion.

FIG. 2A illustrates a signal output $I'_A(x)$ before calibration. A mild signal output deficiency 150 is apparent at the region of the detector array corresponding to defect 112 (FIG. 1). This demonstrates the signal non-uniformity during calibration when the cassette is absent.

FIG. 2B shows a normalization function $I'_B(x)$ containing a compensating region 152 used to correct for the signal deficiency 150.

FIG. 2C illustrates a uniform output $I'_C(x)$ resulting from multiplying normalizing function $I'_B(x)$ by output $I'_A(x)$.

FIG. 2D illustrates a signal output $I'_D(x)$ during a scan, which signal contains a signal deficiency 154 resulting from defect 112. The deficiency is shifted along the X axis due to the presence of the cassette.

FIG. 2E illustrates a signal output $I'_E(x)$ with cassette 116 in place. $I'_E(x)$ contains two gradual, adjacent peaks, 156 and 158 which result from defect 112 in a similar manner to that presented with reference to FIG. 12E. These peaks manifest themselves in an output image as two barely visible, wide stripes wherein the stripe associated with peak 156 is somewhat dark and the stripe associated with peak 158 is somewhat bright.

It will be appreciated that the visibility of the stripes associated with peaks 156 and 158 is negligible relative to that of the stripes resulting from peaks 136 and 138

(FIG. 12E). In general, as light path 140 becomes larger, peaks 136 and 138 become flatter, i.e., smaller and wider.

Creating a light path colinear with a line connecting array detector 120 and cassette 116 is sometimes impossible due to mechanical considerations. In such cases, a folded optical path is utilized.

Figure 3A:
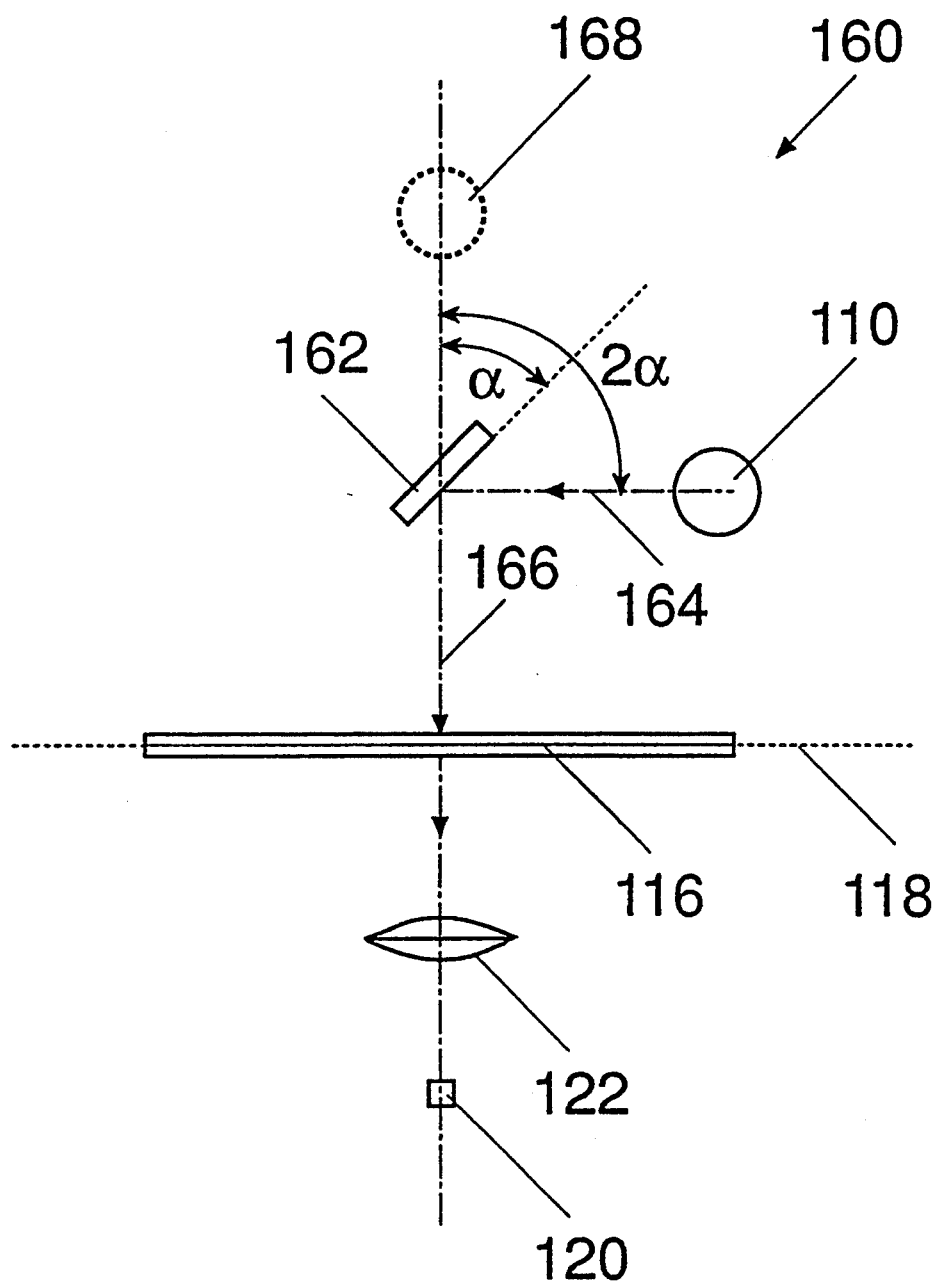
FIGS. 3A and 3B are schematic illustrations of two alternative embodiments of the present invention.
Figure 3B:
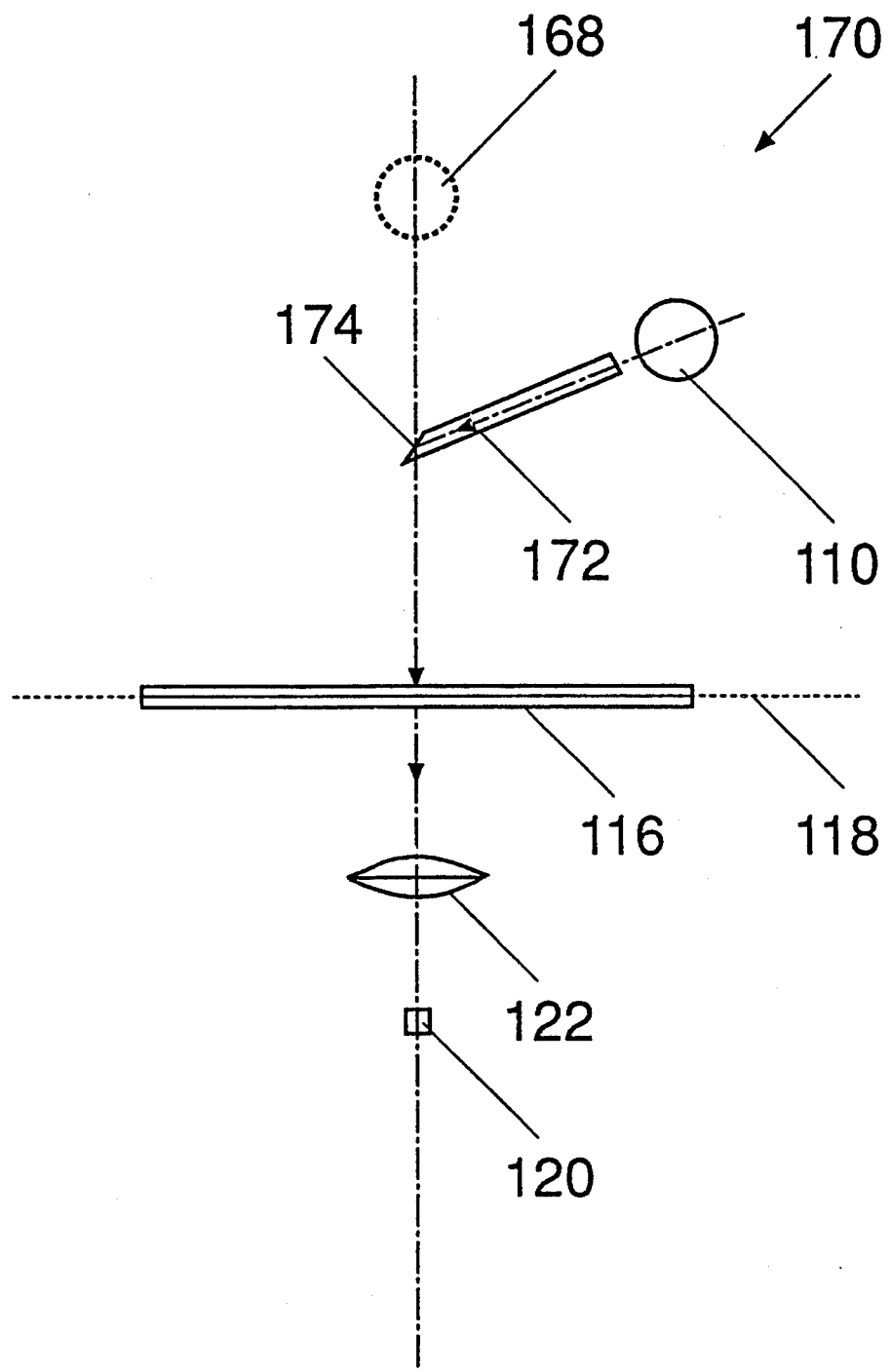

Providing a light source far from the focal plane via folding of the optical axis:

Reference is now made to FIGS. 3A and 3B which respectively schematically illustrate features of two alternative optical scanners 160 and 170. Similar elements in scanners 10, 160 and 170 serve similar functions and are referenced by similar reference numerals.

In accordance with the present invention, scanner 160 further comprises a mirror 162, located close to cassette 116, for directing light coming from light source 110 towards lens 122. The resultant light path, formed of light path sections 164 and 166 shown with dotted lines, is sufficiently large that defects in the signal output of lamp 110 are rendered negligible in an output image.

Light source 110 has a virtual image at a position 168 that is identical to the position of light source 110 in scanner 10 (FIG. 1). Additionally, the light path formed of sections 164 and 166 has a length similar to that of light path 140. As a result of the aforementioned similarities, FIG. 2B graphically illustrates the reduced irregularity in output images effected by scanner 160.

Mirror 162 and lens 122 of scanner 160 are chosen with specifications that are suitable to particular applications. For example, as is known to any person in the art of optics, the mirror width should be at least as large as the cross-section of the numerical aperture of the lens 122 in the plane of the mirror. The length of the mirror should be at least as large as the length of a scanned line corrected by the distance of the mirror to the focal pane and to the numerical aperture of the lens 122.

In accordance with the present invention, the mirror 162 preferably has a high optical quality surface since, because mirror 162 is close to cassette 116, scratches or other similar defects of the mirror surface will result in stripes in the output signal of the type described with reference to FIGS. 12A- 12E.

It will be appreciated that the requirement of a high optical quality surface can be realized with conventional manufacturing techniques, as is known in the art. The same requirement for the light source 110 is typically impractical from a manufacturing standpoint.

The coating of the mirror 162 can be either front coated or rear coated. For a front coated mirror, a good value for the surface scratches and digs quality (S&D) is required from only one surface of mirror 162. However, the coating is not as well protected as in a rear coated mirror. A rear coated mirror, in addition to the requirement of having two surfaces of high quality, requires a low value for the bubbles content.

In the present application, the term "bubbles" refers to internal bubbles in optical glass as well as to all other enclosures in the glass that disturb the uniformity of the bulk of the glass.

It will be noted that a very thick, rear surface coated mirror may also require that, during geometry design, attention be paid to the refraction index of the mirror glass.

It will be appreciated that the type of coating chosen should fit the desired light spectrum of the scanner 160.

Scanner 170 typically comprises a light guide 172, typically located close to cassette 116. Light guide 172 is chosen with dimensions that are suitable to the desired applications of scanner 170; dimension considerations are discussed hereinabove with respect to mirror 162.

Light guide 172 is preferably designed for total internal reflection from surface 174 in order to provide high reflective efficiency. With total internal reflection, there is no need to coat surface 174.

Principles of design and design considerations for light guide 172 are known to those skilled in the art of optics. One example consideration is discussed hereinbelow with respect to FIGS. 4A and 4B to which reference is now briefly made.

Figure 4A:
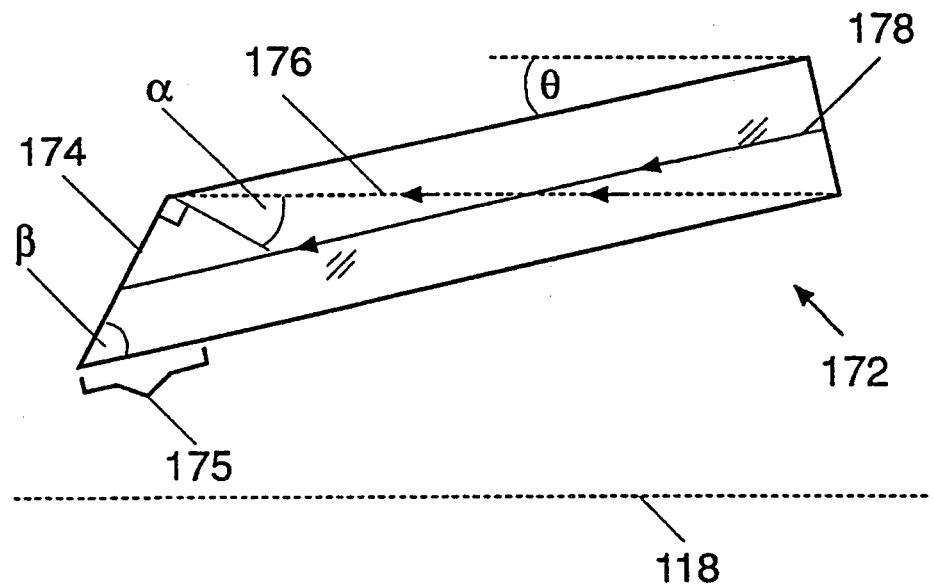
FIGS. 4A and 4B are schematic illustrations demonstrating angular design aspects of one embodiment of the present invention.

FIG. 4A illustrates an example light guide 172 in which the material of the light guide has an index of refraction of approximately 1.55. With such an index of refraction, the minimum incidence angle which provides total reflection is 40.2°.

The length of the example light guide is about 150 mm and is 5 mm thick. Light rays, such as light ray 176, are incident at a low angle $\alpha$. To ensure that all the light rays incident directly on plane 174 are totally reflected, angle $\beta$ is set to 42.4°.

Furthermore, the light guide 172 is typically located at an angle $\Theta$ to focal plane 118. In the embodiment of FIG. 4A, $\Theta$ is set to 8°, allowing at least one center light ray 178 to be directed along the optical axis of the scanner.

Because surfaces 174 and 175 are located close to the cassette 116, scratches or other similar defects on them will result in artifactual stripes in the signal output of the type discussed with reference to FIGS. 12A–12E. Therefore, a high quality optical surface is preferred for the surfaces 174 and 175 in order to provide for optimal performance of the present invention. Bulk quality is also required for the glass volume near surfaces 174 and 175.

Figure 4B:
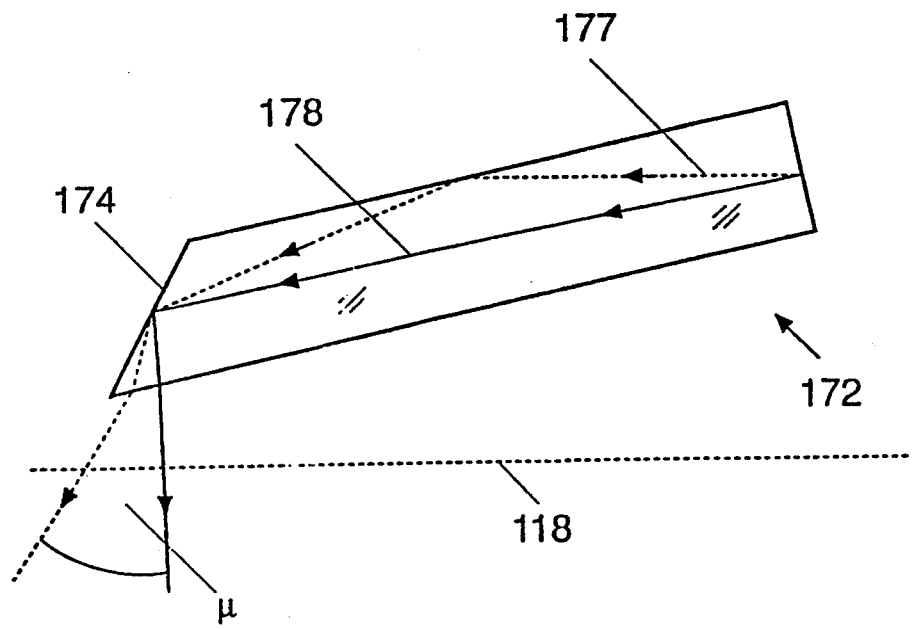

FIG. 4B illustrates a light guide with light bundles 177 that traverse the light guide and undergo multiple reflections off of internal light guide surfaces before exiting the light guide. These light bundles 177 emerge from the light guide at an angle $\mu$ relative to central light rays 178 undergoing only a single reflection off an internal surface. The angle $\mu$ increases with increasing number of internal reflections.

The light bundles 177 undergoing multiple reflections are generally less intense than light ray 178 which undergoes only a single reflection at surface 174. Although bundles 177 can be used in the case of mechanical constraints of the scanner 170, it is preferable to use those bundles, such as rays 178, which are reflected only once from surface 174.

Figure 5:
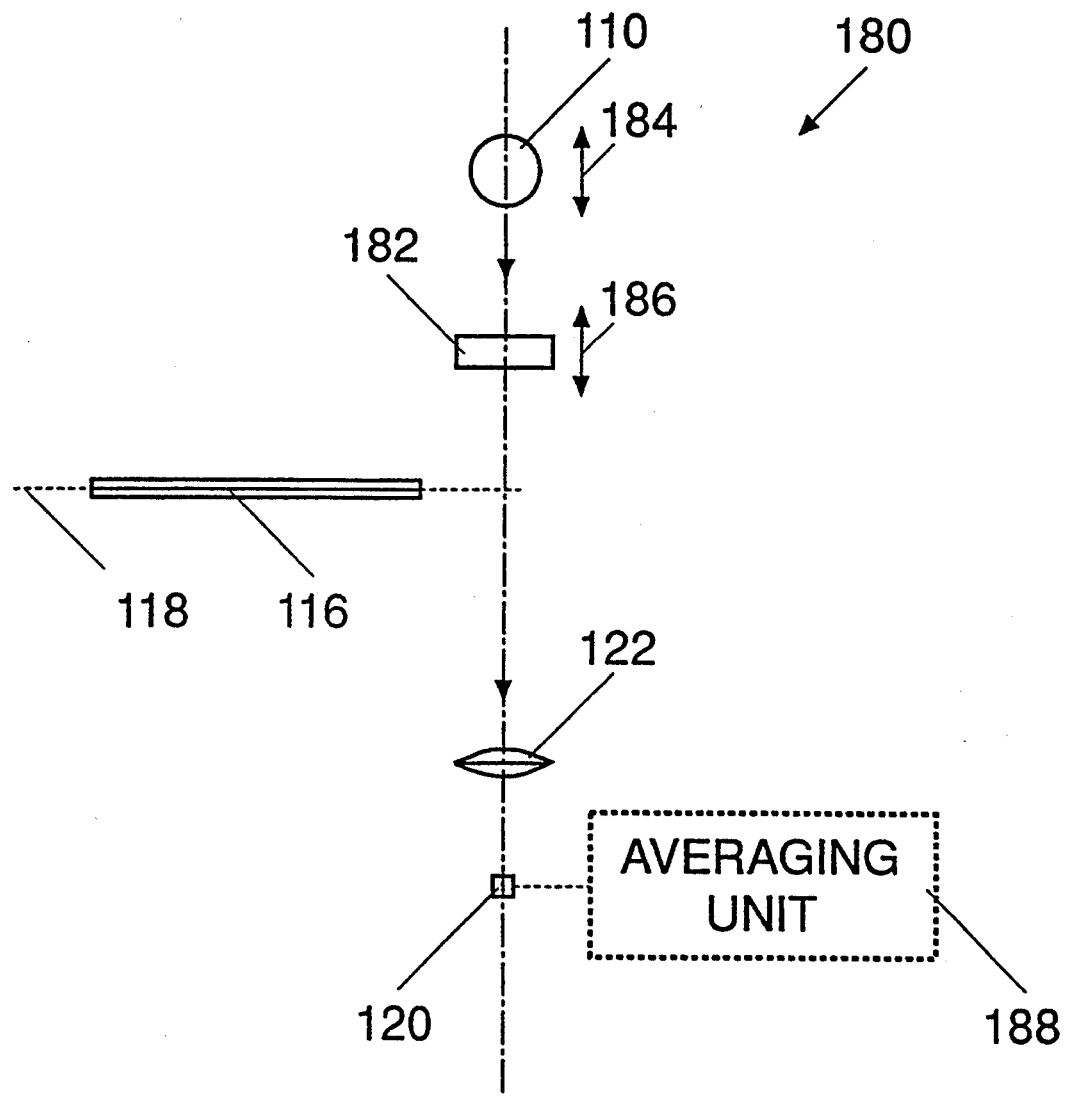
FIG. 5 is a schematic illustration of alternative embodiments of the present invention.

Calibration of the scanner with a calibration glass:

Reference is now made to FIG. 5 which schematically illustrates a further alternative embodiment of the present invention. Similar elements in FIGS. 5 and 1 serve similar functions and are referenced by similar reference numerals.

The scanner of the present embodiment, labeled 180, further comprises a transparent "calibration glass" 182 to be used during calibration only. Calibration glass 182 resembles cassette 116 both in thickness and optical index of refraction and thus, during calibration, provides scanner 180 with optical refractive properties similar to those that are present while scanning with cassette 116.

Calibration glass 182 refracts the transmitted light so that the signal deficiency due to light source defect 112 occurs in the same position as signal deficiency 134 (FIG. 12D). In this manner, subsequent normalization does not lead to stripes in the output image, as discussed with reference to FIG. 12E.

Calibration glass 182 can have three general types of imperfections, flatness and parallelism (F&P), surface scratches and digs (S&D) and "internal bubbles", which distort scanner calibration as well as the resulting output images. In the following description, enclosures in the glass will be referred to as internal bubbles.

Glass with a low F&P quality tends to distort the output image. A low quality for parallelism generally causes a shift in the light source image position. The extent of the shift is directly proportional to the distance of the calibration glass 182 from the light source 110. A low quality for flatness generally causes local disposition of the light image. The two effects cause a shift of the image of deficiency 112 between calibration and scanning and therefore, are source of calibration errors.

Glass with a low S&D quality causes diffusion of light in a fashion similar to light source defect 112 and produces similar stripes. The same is true for internal bubbles.

In accordance with the present invention, the quality of the calibration glass 182 typically determines its location, as well as the location of light source 110, in the scanner 180. This is illustrated in FIG. 5 by arrows 184 and 186 which indicate that the light source 110 and glass 182, respectively, are located at different locations depending on the quality of calibration glass 182.

If the glass 182 is of good quality (e.g. high F&P, high S&D and bubble qualities such that the image quality is not affected by whatever F&P or S&D deficiencies remain in the glass 182), it can be placed anywhere between light source 110 and lens 122, and light source 110 is typically located near the focal plane 118.

It will be appreciated that dust which accumulates on the good quality calibration glass 182, when the glass 182 is located close to the focal plane, will effect the calibrations in a manner similar to the effect of defect 112. The effects of the dust can be reduced by either locating the glass 182 away from the focal plane 118 or, if that is not feasible, by incorporating an averaging unit 188, such as a microprocessor, to average a multiplicity of calibration readings from a multiplicity of different locations on the glass 182. The effects of the dust will be averaged out. The averaging also averages out the effects of bubbles in the glass 182.

Calibration glass 182 with a good F&P quality but a low S&D quality is similar to good quality glass with dust on it. This case is treated as described hereinabove with respect to good quality glass with dust on it.

In accordance with the present invention, calibration glass 182 with a good S&D quality but a low F&P quality is located as close as possible to light source 110. If the glass accumulates dust, both the lamp and the calibration glass 182 are moved away from the focal plane. Alternatively, the averaging unit 188 can be utilized, as described hereinabove, to average the effects of both dust and bubbles in the glass 182.

If, in a scanner to be calibrated, the cassette 116 is normally placed very close to the light source, then a clear portion of the cassette can be utilized instead of the calibration glass 182 with a low F&P quality.

It is important to note that calibration glass 182 of good quality should be placed parallel to focal plane 118. Non-parallel placement of calibration glass 182 typically results in image displacement similar to that encountered when using a calibration glass with low F&P as discussed hereinabove.

The amount of tilt that may be tolerated depends upon the size of individual detector elements in detector array 120. In particular, image displacement on the detector array due to tilt of calibration glass 182 relative to cassette 116, assuming that the optical indices of refraction of both are similar, is approximately 0.006 mm per degree of relative tilt and per 1.0 mm of thickness of calibration glass 182. The size of the detector elements, on the other hand, is normally on the order of 0.01 mm.

Addition of a light path or insertion of a calibration glass is not always convenient or practical for an optical scanner. It is, nevertheless, desired to correct for the presence of defect 112 and compensate for the refractive properties of cassette 116 so as to avoid artifactual stripes as discussed in detail with reference to FIGS. 12A–12E.

Figure 6:
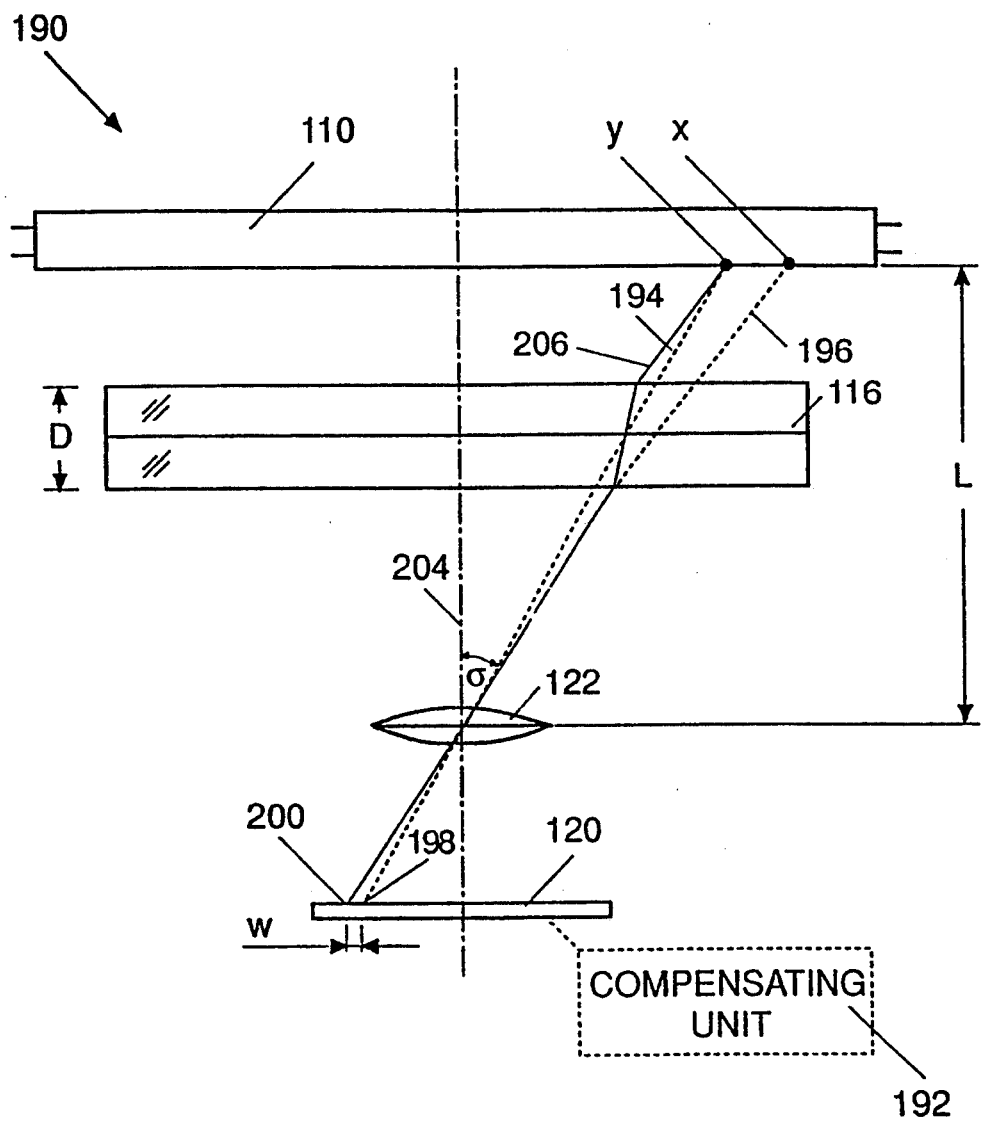
FIG. 6 is an illustration of a further embodiment including a compensating unit for compensating for the refractive properties of glass.

Computational calibration of a scanner:

Reference is now made to FIG. 6, which illustrates a scanner 190 forming an additional embodiment of the present invention. Scanner 190 comprises compensating unit 192 for computationally compensating for differences in optical refractive properties of scanner 190 in the presence and absence of cassette 116. If desired, scanner 190 can have a long light path, as in the previous embodiments described hereinabove, however, it is not necessary.

FIG. 6 also illustrates geometrical and trigonometric relationships necessary to compensate for the above-mentioned differences in optical refractive properties.

Cassette 116 has an optical index of refraction n and a thickness D. In the absence of cassette 116, light rays 194 and 196, emanating respectively from points y and x on light source 110, travel in straight lines, in the case of a thin lens 122, to points 198 and 200, respectively, on detector 120.

When cassette 116 is introduced, light rays 194 and 196 no longer travel in straight lines from the light source 110 to the detector array 120. Instead, a light ray 206 emanating from point y arrives at point 200. This is in accord with the shift in signal deficiency discussed with reference to FIG. 12D and leads to stripes in an output image as discussed hereinabove with reference to FIG. 12E.

A distance W between points 198 and 200 is determined by the following equation:

$$W = m(x - y) \tag{4}$$

where m is the optical magnification of the lens 122. The distance (x−y) is determined by the following equation:

$$(x - y) = D[\tan(\sigma) - \tan(\sigma')] \tag{5}$$

where $\sigma$ is the angle between light ray 194 emanating from point y to point 198 and the optical axis 204. $\sigma'$ is given by the following equation:

$$\sigma' = \arcsin(\sin(\sigma)/n) \tag{6}$$

where n is the optical index of refraction of cassette 116.

Since the pixel sensitivity is a constant, the change in the output signal of a given pixel, for example pixel 198, when the cassette glass 116 is included, is a function of the fact that the pixel 198 receives light from a different location on the light source 110.

The change in the output signal can be measured by providing a known change in the optical system without introducing the cassette glass 116 and measuring the changed output of the detector array.

Figure 7A:
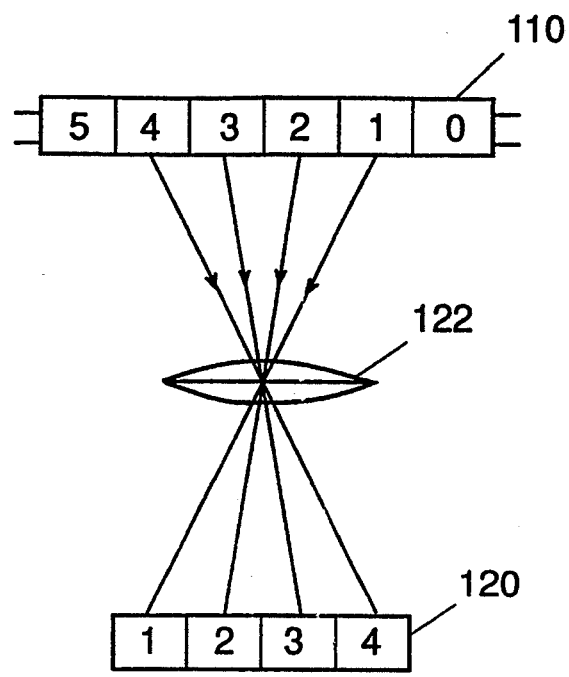
FIGS. 7A and 7B are schematic illustrations indicating two different light distributions over a detector array, useful in understanding a further embodiment of the present invention.
Figure 7B:
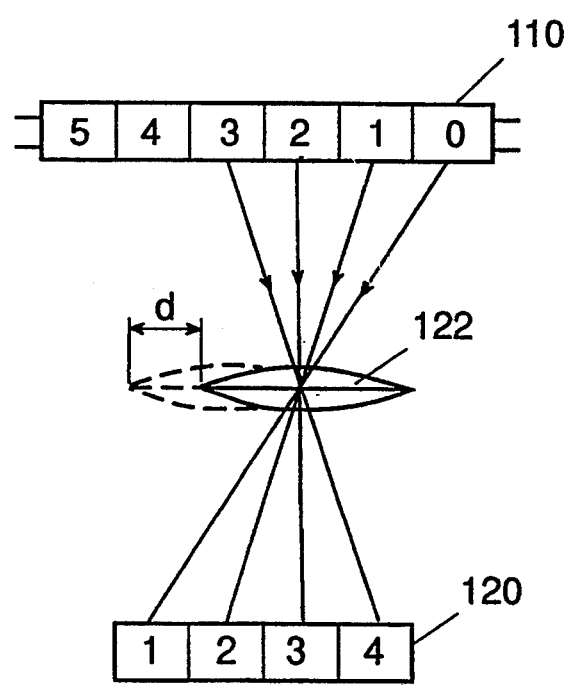

An example change in the optical system is shown in FIGS. 7A and 7B wherein, in FIG. 7B, the lens 122 is displaced in a direction parallel to the longitudinal axis of the detector array 120 by some known distance d from its location in FIG. 7A, marked, in FIG. 7B, with a dotted line. Such an operation can be performed in any scanner which is capable of translating the lens 122. Such a scanner is, for example, the Smart Scanner manufactured by Scitex Corporation Ltd. of Herzlia, Israel.

In the first measurement, shown in FIG. 7A, the light from an area i of the light source 110, having a corresponding intensity $I_i$, impinges on a detector i of detector array 120. Detector i produces an outlet voltage $V_{i,i}$ which is a function of the sensitivity $S_i$ of the detector i and of the impinging light intensity $I_i$, as follows:

$$V_{i,i} = S_i I_i \qquad (7)$$

Equation 7 is operative for each of the plurality of detectors i in the detector array 120.

In the second measurement, the lens 122 is translated the distance d such that light from an adjacent area $i-1$ impinges on a given detector i. Thus, for the second measurement, equation 7 becomes:

$$V_{i,i-1} = S_i I_{i-1} \qquad (8)$$

for each of the plurality of detectors i in the detector array 120.

The plurality of equations 7 and equations 8 can be rearranged to solve for each $S_i$ and $I_i$, as follows:

$$S_i = S_1(\text{mult}(V_{k,k-1}/V_{k-1,k-1})), k=2 \text{ to } i \qquad (9)$$

$$I_i = I_0(\text{mult}(V_{k,k}/V_{k,k-1})), k=1 \text{ to } i \qquad (10)$$

where "mult" indicates a multiplication of the terms for all k indicated to the right of the equation, or:

$$S_i = S_1 r_i \qquad (11)$$

$$I_i = I_0 q_i \qquad (12)$$

When the cassette glass 116 is placed into the optical path, detector i receives light from some area j on the light source 110, as determined by equations 4–6 hereinabove. The equation determining the output voltage of the detector i is:

$$V_{i,j} = S_i I_j \qquad (13)$$

which can be rewritten, using equations 11 and 12, as:

$$V_{i,j} = S_1 I_0 r_i q_j \qquad (14)$$

Since $V_{1,0} = S_1 I_0$ according to equation 13 equation 14 can be rewritten as:

$$V_{i,j} = V_{1,0} r_i q_j \qquad (15)$$

where $V_{1,0}$ is measured in the second measurement. Thus, it is not necessary to know either the sensitivity of each detector nor the intensity of light provided by each section of the light source 110.

If detector i receives light from an area j' which is formed of parts of two light areas j and j+1 (i.e. the cassette causes a translation $x \to +y$ of a non-integral number of pixels), the output of the detector i can be calculated via interpolation as follows:

$$V_{i,j'} = V_{1,0} r_i ((1-a) q_j + a q_{j+1}) \qquad (16)$$

where a is the distance from the center of light area j to the center of light area j', in the direction of light area j+1 and one unit of a is the distance from light area j to j+1.

It will be appreciated that the interpolation method of equation 16 is not the only method available; other methods of interpolation can be alternatively performed. Furthermore, additional measurements, including those having sub-pixel displacements, can be used for more accurate calculations.

In accordance with the present invention, compensating unit 192 is constructed and operative to modify the output of detector array 120 according to equations 4–16 in order to recalculate the output each detector element when cassette 116 is in place. In this manner, generally no artifactual stripes of the type discussed in detail with reference to FIGS. 12A–12E will appear.

Those skilled in the art of optics are familiar with such correction calculations to different orders of accuracy using paraxial equations or commercially available optical software, such as Code-V available from Optical Research Associates, Pasadena, Calif.

It will be appreciated by those skilled in the art that displacing the light source image relative to the detector array, when producing the second measurement of FIG. 7B, is not limited to one pixel or to an integer number of pixels.

It will further be appreciated that any translation which produces a displacement between the light distribution over the detector array 120 and the detector array 120 can be performed. For example, any one of the light source 110, lens 122 or detector array 120, or a combination thereof, can be translated, depending on the capabilities of the scanner. Furthermore, a glass plate positioned between the light source 110 and the detector array 120 can be tilted to provide the translation.

Figure 8:
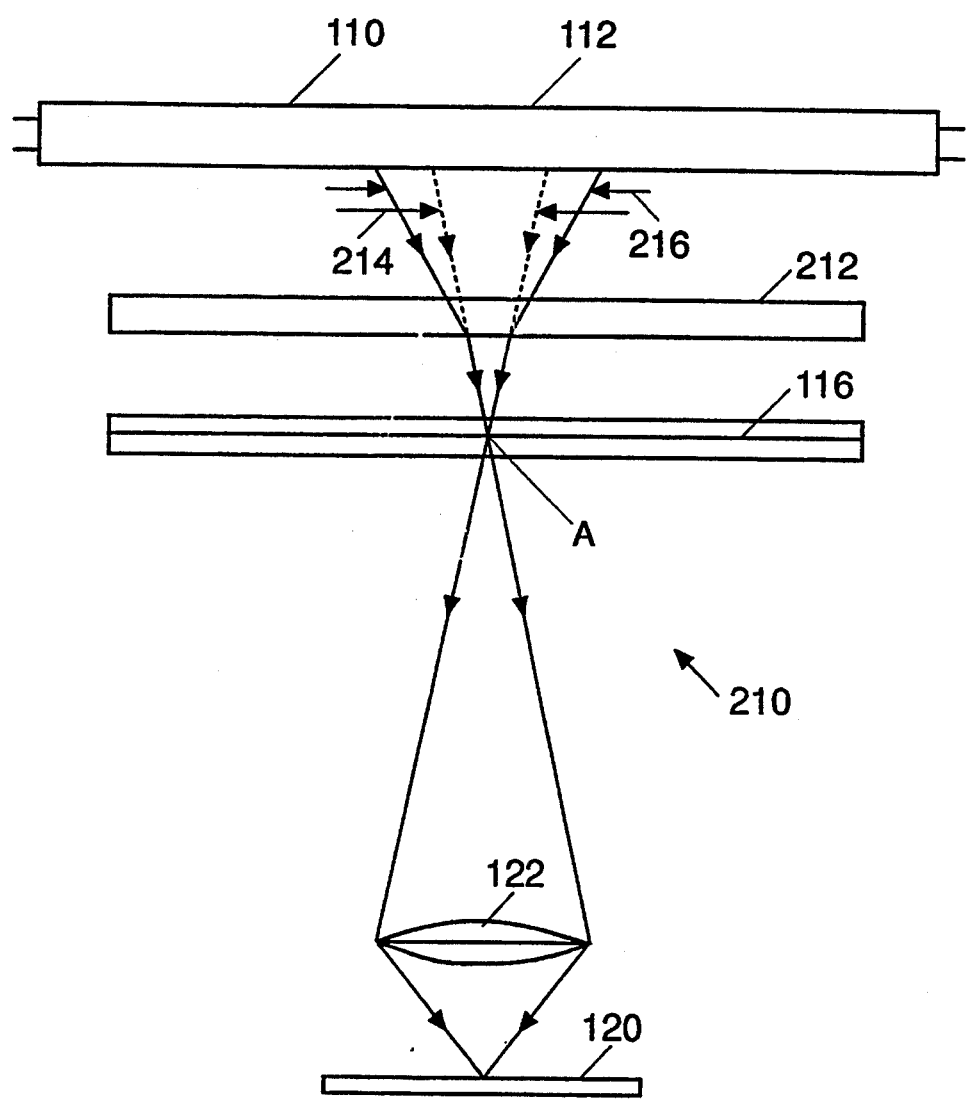
FIG. 8 is an illustration of a further embodiment including a diffuser for diffusing light from a light source.

Finally, it will be appreciated that the cassette glass 116 provides a non-uniform displacement, wherein the displacement is large at the ends and small at the center. Providing a diffuser between the light source and the cassette glass:

Reference is now made to FIG. 8 which illustrates a scanner 210 which is a further embodiment of the present invention and incorporates a diffuser 212. Diffuser 212, located between the light source 110 and the location of cassette 116, scatters light impinging upon it. Diffuser 212 can be, for example, ground glass, and its scattering efficiency is dependent on its granulation.

In prior art scanners, the lens 122 is focussed on cassette 116 and the light from a given location, labeled A, on the cassette 116 arrives from a given area, labeled 214, of light source 110. The size of area 214 is defined by the numerical aperture of the scanner.

In scanner 210, the light at a given location on cassette 116 arrives from an area 216 which is larger than area 214. In both scanners 100 and 210, the effect on the light caused by defect 112 is averaged over the areas 214 and 216, respectively. Since the area 216 is larger than area 214, the effect of the defect 112 is reduced.

The extent of the reduction, called the "averaging power" of the diffuser, depends on the ratio of areas 214 and 216. The sizes of areas 214 and 216 depend on the scattering angle of the diffuser 212 and the geometry of the scanner 210. The averaging power increases with increased scattering angle and increased distance between light source 110 and diffuser 212.

Further, the distance between the cassette 116 and the diffuser 212 should be increased with increasing granulation and optical resolution of the scanner 210. Otherwise, the diffuser 212 can become a further source of non-uniformities.

It should be noted that addition of diffuser 212 can cause a loss of light in the scanner 210 for the following sources: reflection of light from the diffuser 212 backwards towards the light source 110 and if the area 216 is larger than the extent of light source 212.

The scanner designer should consider the abovementioned effects and select a scattering efficiency, for a scanner being designed, which successfully trades the desired scattering effects against the loss of light.

Updating only the low frequency content correction signal:

Reference is now made to FIGS. 9A–9F which illustrate operations for updating only the low frequency content of the correction signal before each scan.

Figure 9:
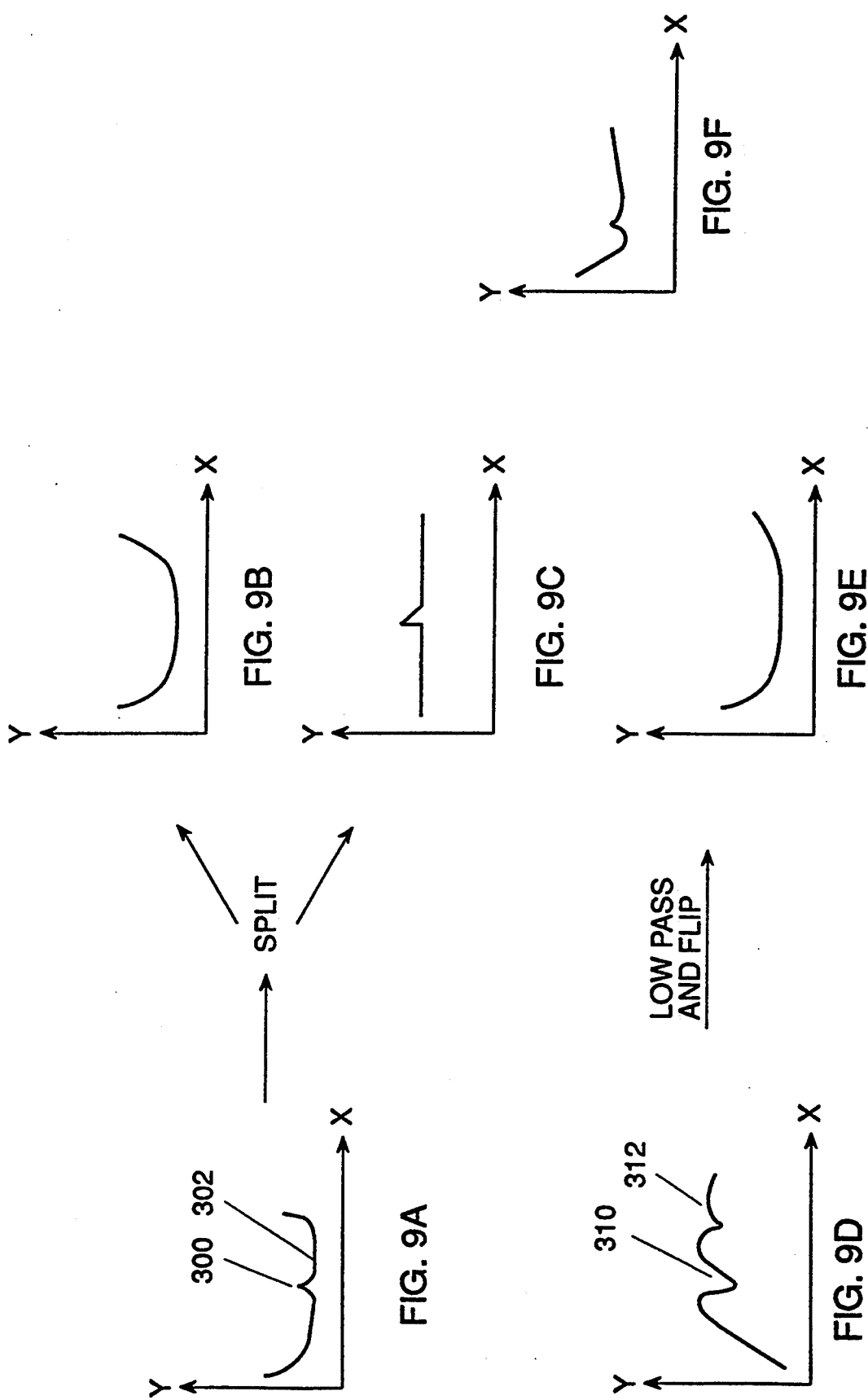
FIGS. 9A–9F are graphical illustrations of calibration signals and operations thereon useful in understanding a still further embodiment of the present invention.

In this embodiment, a general correction signal, shown in FIG. 9A, is typically produced during regular maintenance periods, in accordance with the method described hereinabove with respect to FIG. 5. This correction signal is an averaged correction signal and contains in it both high spatial frequency components 300 and low spatial frequency components 302.

High spatial frequency components 300 are typically caused by non-uniformities in single elements, such as a detector, and correspond to corrections for fixed non-uniformities in the scanner, such as reduced sensitivities in one or more detectors. The high frequency component corrections typically do not change much over time and thus, need only to be measured, and the corrections calculated, during regular maintenance intervals.

Low spatial frequency components 302 are typically caused by non-uniformities measured by a large number of detector elements and typically correspond to non-uniformities in the light source and other elements of the imaging system. Because the behavior of the light source is variable and depends on the power supply, temperature, etc., the light source and other low frequency non-uniformities must be corrected before each scan.

Therefore, in accordance with this embodiment of the present invention, a calibration scan is performed during a regular maintenance period over a large scanning area. The measured outputs of the detector array 120 are averaged and a correction signal, shown in FIG. 9A, is calculated and stored. It will be appreciated that the averaging procedure can take a significant amount of time.

In one embodiment of this operation, the correction signal of FIG. 9A is split, via Low Pass and High Pass Filters, into its low (FIG. 9B) and high (FIG. 9C) frequency components, both of which are stored.

Before every image scan, a calibration scan of a few lines is performed. The output (FIG. 9D) will contain low and high frequency components, where the high frequency components correspond to dust particles (labeled 312) and to reduced detector sensitivities (labeled 310). Since, for the calibration update, only the low frequency component is of interest, the output is filtered with a low pass filter, to remove the high frequency content, and converted to create a low frequency update calibration signal (FIG. 9E).

The low frequency update calibration signal (FIG. 9E) is multiplied with the stored high frequency calibration signal (FIG. 9C) to produce the calibration signal (FIG. 9F) which will be utilized for the upcoming image scan.

Alternatively, the output calibration signal (FIG. 9F) can be produced as follows:

a) perform the regular maintenance calibration scan, determine a maintenance calibration signal, formed of a calibration factor for each detector in detector array 120, in accordance with the methods described hereinabove, and store the results;

b) from the output signal, or signals, of the calibration scan or scans, determine new calibration factors, in accordance with the methods described hereinabove, for each of the detectors of the detector array 120;

c) for each detector in the detector array 120, determine the ratio between the new calibration factors produced in step b and the maintenance calibration factors produced in step a;

d) average the calibration ratios over a plurality of detectors, to produce an average calibration factor. The averaging will reduce high frequency calibrations; and e) multiply the maintenance calibration signal by the average calibration factor found in step d to produce the new calibration signal shown in FIG. 9F. The new calibration signal has a new low frequency component while maintaining the previously determined high frequency component.

Other methods for modifying the low frequency component of the regular maintenance calibration scan can alternatively be performed.

Both methods described herein shorten pre-scan calibration time by requiring less data for the calibration calculations. In addition, they are useful for reducing the effects of dust on the cassette glass. An alternative method for reducing the effects of dust on the cassette glass 116 is described hereinbelow with respect to FIG. 10.

Figure 10:
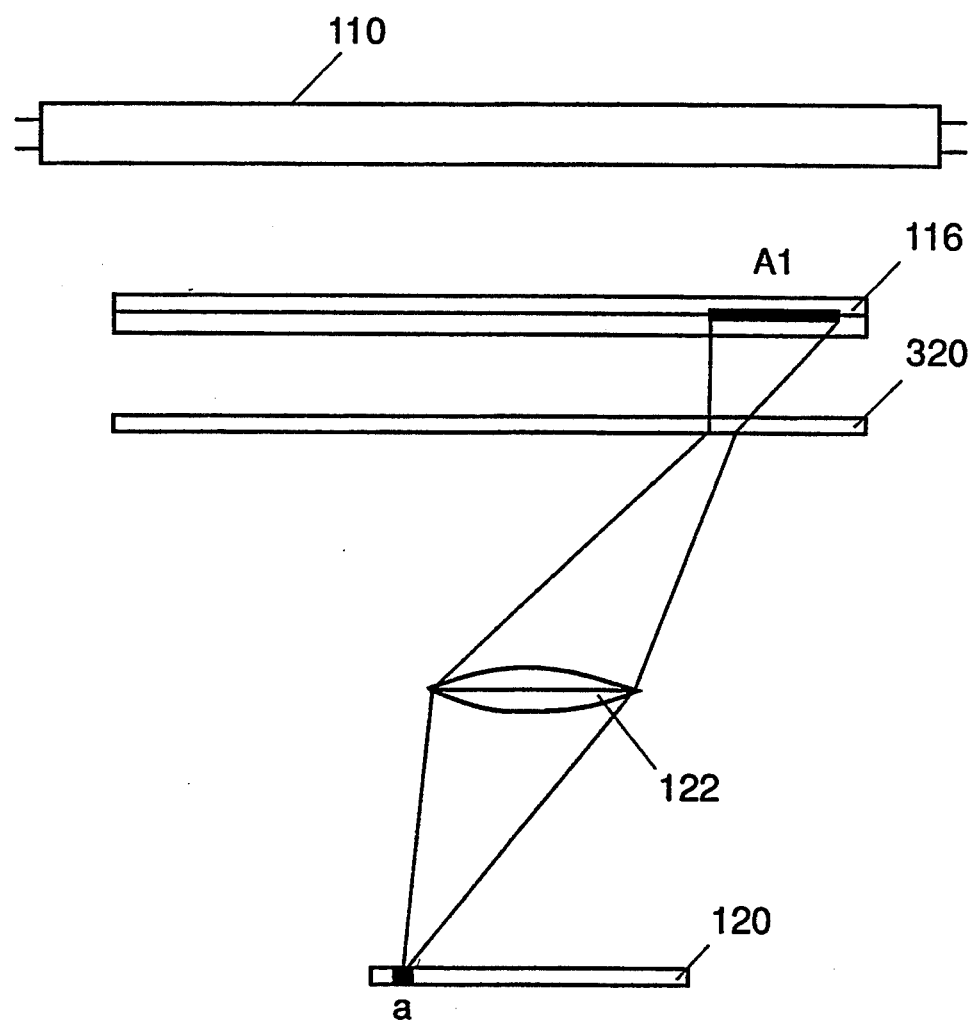
FIG. 10 is a schematic illustration of a scanner utilizing a diffuser for diffusing light through a cassette glass.

Providing a diffuser between the cassette glass and the lens:

Reference is now made to FIG. 10 in which a diffuser 320 is placed, during the calibration scan only, between the cassette glass 116 and the lens 122. The diffuser 320 is operative to average the light coming from the relatively large area A1 of the cassette glass 116, thereby to spread the effects of any dust particles over a plurality of detector elements.

It will be appreciated by those skilled in the art that the addition of the diffuser generally causes a decrease in the intensity of the output signal of the detector arrays. The size of the decrease depends on the diffuser and is a constant. Therefore, it can be compensated while determining the calibration signal, via a scaling factor.

It will be appreciated by those skilled in the art that more than one of the calibration methods described hereinabove may be used together in one scanner thereby to provide better results.

Furthermore, it will be appreciated that partial implementation of one correction method in conjunction with partial implementation of a second correction method can also provide acceptable results. For example, a medium quality mirror (as opposed to a high quality mirror) can be placed a distance from the focal plane, where the distance is large, but not as large as for a low quality mirror.

It will be appreciated by persons skilled in the art that the present invention is not limited by what has been particularly shown and described hereinabove. Rather the scope of the present invention is defined only by the claims which follow.

We claim:

1. An illumination means for a scanner comprising:
   a light source, having non-uniformities, for transmitting light through an input sample;
   a cassette for holding said input sample; and
   a color separation sensor for sensing said input sample,
   wherein a distance from said light source to said cassette is long enough to cause the effects of said non-uniformities to be substantially reduced,
   the scanner comprising a 15 mm diameter lens located 200 mm from said cassette, said distance from said light source to said cassette being 100 mm.

2. An illumination means for a scanner comprising:
   a light source, having non-uniformities, for transmitting light through an input sample;
   a color separation sensor for sensing said input sample,
   light detector means for detecting light originating from said light source; and
   a calibration glass for calibrating said light detector means so as to cause the effects of said non-uniformities to be reduced.

3. An illumination means for a scanner to claim 2 having a focal plane and a cassette for locating said input sample in said focal plane.

4. An illumination means for a scanner according to claim 3 having a lens and wherein said calibration glass is of good quality and is located between said light source and said lens.

5. An illumination means for a scanner according to claim 3 and wherein said calibration glass is located near said focal plane.

6. An illumination means for a scanner according to claim 3 and wherein said calibration glass is located away from said focal plane.

7. An illumination means for a scanner according to claim 3 and also including means for averaging multiple readings from said detector means corresponding to a multiplicity of regions of said calibration glass, thereby to average effects of bubbles in said calibration glass and dust on said calibration glass.

8. An illumination means for a scanner according to claim 3 and wherein said calibration glass has a good flatness and parallelism value and a low surface scratches and digs quality.

9. An illumination means for a scanner according to claim 8 and also including means for averaging multiple readings from said detector means corresponding to a multiplicity of regions of said calibration glass, thereby to average effects of bubbles in said calibration glass and dust on said calibration glass.

10. An illumination means for a scanner according to claim 3 and wherein said calibration glass has a low flatness and parallelism value and a good surface scratches and digs value.

11. An illumination means for a scanner according to claim 10 and wherein said calibration glass is located generally close to said light source.

12. An illumination means for a scanner according to claim 11 and wherein said calibration glass and said light source are not close to said focal plane.

13. An illumination means for a scanner according to claim 11 and also including means for averaging multiple readings from said detector means corresponding to a multiplicity of regions of said calibration glass, thereby to average effects of bubbles in said calibration glass and dust on said calibration glass.

14. An illumination means for a scanner according to claim 3 which is calibrated without said cassette and without said calibration glass and also including compensation means for compensating for the presence of said cassette during operation.

15. An illumination means for a scanner according to claim 14 and wherein said compensation means perform geometrical correction calculations based on the optical qualities of said cassette and said lens.

16. An illumination means for a scanner according to claim 14 wherein said light detector means includes a plurality of detectors and wherein said compensation means includes means for determining on which detector light from a section of said light source will fall, in the presence and absence of said cassette glass.

17. An illumination means for a scanner according to claim 16 and also including means for determining an expected output signal of each of said plurality of detectors as a result of the intensity of light received from a corresponding section of said light source.

18. An illumination means for a scanner according to claim 17 and wherein the means for determining an expected output signal comprise:
    means for measuring the output of the detector as a response to a first and second light distributions over said light detector means, wherein said first and second light distributions are different; and
    means for determining, from said responses to said first and second light distributions, the output of said light detector means in response to a third light distribution over said light detector means.

19. An illumination means for a scanner according to claim 18 and including means for providing a displacement of at least one of said light source, said light detector means and a lens, located between said light source and said light detector means, thereby to provide said first and second light distributions.

20. A method of calibrating an illumination for a scanner comprising the steps of:
    measuring an output signal of at least two detectors of a light detector array in response to a first light distribution over said light detector array;
    displacing a portion of said illumination means for a scanner, in a direction generally parallel to a longitudinal axis of said light detector array, thereby to provide a second light distribution over said light detector array;
    measuring an output signal from said at least two detectors in response to said second light distribution; and
    determining, from said responses to said first and second light distributions, the output of said detector array in response to a third light distribution over said detector array.

21. A method according to claim 20 and wherein said step of displacing includes the step of non-uniform displacement.

22. An illumination means for a scanner comprising:

a light source;

a lens;

a color separation sensor for sensing an input sample;

a light detector which receives light from said light source through said input sample and said lens, wherein said light source, said lens and said light detector have non-uniformities therein;

means for creating an average calibration signal to correct for fixed ones of said non-uniformities; and means for modifying low frequency components of said average calibration signal with low frequency components of a pre-scan calibration signal.

23. An illumination means for a scanner according to claim 22 and wherein said means for creating includes means for dividing said average calibration signal into low and high frequency components.

24. An illumination means for a scanner comprising:

a cassette upon which dust falls;

a lens;

a light detector;

a color separation sensor for sensing an input sample;

a light source for transmitting light through said cassette and said lens to said light detector; and a diffuser located between said cassette and said lens during a calibration pre-scan, thereby to reduce effects of said dust on said cassette.

* * * * *